(12) United States Patent
Bottura

(10) Patent No.: US 7,588,253 B2
(45) Date of Patent: Sep. 15, 2009

(54) SEALING SYSTEM WITH SEALING RING

(75) Inventor: Cesare Bottura, Brescia (IT)

(73) Assignee: Olab S.R.L., Torbole Casaglia, Brescia (IT)

( * ) Notice: Subject to any disclaimer, the term of this patent is extended or adjusted under 35 U.S.C. 154(b) by 488 days.

(21) Appl. No.: 09/983,841

(22) Filed: Oct. 26, 2001

(65) Prior Publication Data

US 2003/0030231 A1 Feb. 13, 2003

(30) Foreign Application Priority Data

Jul. 24, 2001 (EP) ................................. 01830493

(51) Int. Cl.
*F16L 17/06* (2006.01)
*F16L 5/00* (2006.01)
*F16L 25/00* (2006.01)

(52) U.S. Cl. .................... 277/609; 277/616; 277/630; 285/211; 285/220; 285/332.3; 285/344

(58) Field of Classification Search ................ 277/602, 277/604, 606–609, 616, 622–628, 630, 637, 277/641–642; 285/211–212, 219–220, 332.2, 285/332.3, 344, 347
See application file for complete search history.

(56) References Cited

U.S. PATENT DOCUMENTS

| | | | | |
|---|---|---|---|---|
| 2,110,825 A | * | 3/1938 | Archer | .................... 285/113 |
| 2,252,496 A | * | 8/1941 | Dutterer | .................. 174/152 S |
| 2,343,235 A | * | 2/1944 | Bashark | .................... 285/220 |
| 2,381,829 A | * | 8/1945 | Livers | .................... 285/332.3 |
| 2,924,876 A | * | 2/1960 | Lewis | .......................... 29/458 |
| 2,995,057 A | * | 8/1961 | Nenzell | ...................... 411/399 |
| 3,003,795 A | * | 10/1961 | Lyon | ........................... 285/212 |
| 3,164,890 A | * | 1/1965 | Schmohl | .................. 29/890.14 |
| 3,255,916 A | | 6/1966 | Rice | ............................. 220/39 |
| 3,275,348 A | * | 9/1966 | Scott | .......................... 285/212 |
| 3,747,960 A | * | 7/1973 | Bawa | .......................... 285/39 |
| 3,779,462 A | * | 12/1973 | Bruninga | .................... 239/230 |
| 3,933,358 A | * | 1/1976 | Hoer | .......................... 277/637 |
| 4,033,615 A | | 7/1977 | Miller, Jr. et al. | ........... 285/333 |
| 4,150,836 A | * | 4/1979 | Walker | ....................... 277/638 |

(Continued)

FOREIGN PATENT DOCUMENTS

DE 4217154 A1 9/1993

*Primary Examiner*—Vishal Patel
(74) *Attorney, Agent, or Firm*—Fitzpatrick, Cella, Harper & Scinto

(57) ABSTRACT

A sealing system with sealing ring for coupling members for connecting pipes to user devices such as pumps, compressors, tanks and the like, by means of a shank that screws into a seat provided on the said user devices, comprises a groove and an annular seal. The groove, which is shaped according to the teaching of international standard ISO UNI 5711-65, is situated in a position adjacent to the shank of the coupling member, at the opposite end from the end of the shank. The groove is able to receive the annular seal designed to be pressed against an abutting wall or a flared portion of the seat of the user device in order to establish the seal. In the original configuration prior to assembly, the sealing ring is of an essentially cylindrical shape, whereas, in the configuration of compression on the groove, it assumes a shape adapted to the profile of the groove, which is generally frustoconical.

10 Claims, 5 Drawing Sheets

U.S. PATENT DOCUMENTS

| | | | | |
|---|---|---|---|---|
| 4,280,721 A | * | 7/1981 | Narkon | 285/179 |
| 4,498,680 A | * | 2/1985 | Schobbe | 277/641 |
| 4,531,767 A | * | 7/1985 | Andreolla | 285/220 |
| 4,550,937 A | * | 11/1985 | Duret | 285/334 |
| 4,595,219 A | * | 6/1986 | Lenze et al. | 285/333 |
| 4,688,832 A | * | 8/1987 | Ortloff et al. | 285/148.19 |
| 4,705,307 A | * | 11/1987 | Chelette | 285/332.3 |
| 4,934,742 A | * | 6/1990 | Williamson | 285/212 |
| 5,165,731 A | | 11/1992 | Kimuta | 285/220 |
| 5,221,113 A | | 6/1993 | Stoll | 285/333 |
| 5,433,489 A | * | 7/1995 | Kimura et al. | 285/220 |
| 5,441,314 A | * | 8/1995 | Giovanni | 285/211 |
| 5,797,603 A | * | 8/1998 | Voirol et al. | 277/602 |
| 6,322,110 B1 | * | 11/2001 | Banker et al. | 285/334 |
| 6,325,389 B1 | * | 12/2001 | Sharify | 277/604 |

* cited by examiner

SEALING SYSTEM WITH SEALING RING

FIELD OF THE INVENTION

The present invention relates to a sealing system with a sealing ring which can be used on coupling members for connecting pipes to user devices such as pumps, compressors, tanks and the like, essentially in hydraulic, pneumatic and plumbing settings.

BACKGROUND OF THE INVENTION

The connection between a pipe carrying a fluid and a user device is typically effected by a coupling member consisting of a single insert or of an insert with an associated appropriately shaped swivel nut.

In a connection made with a single insert, one end of the insert is connected to the pipe while the other is provided with a shank that screws into a seat on the user device.

When making the connection with an insert and a swivel nut, one end of the insert is connected to the pipe while the other end is connected to the swivel nut. In this version of the coupling member, the swivel nut is provided with a threaded shank that screws into the seat on the user device.

The sealing system, in both the insert-type connection and in the insert with swivel nut-type connection prevents fluid leaking out through the threaded connection formed between the shank of the coupling member and the seat of the user device, especially when the threaded connection is not fluidtight. This is particularly the case when using coupling members with shanks provided with a short thread.

The current tendency is to use threads characterized by having little length in the direction of the axis of the shank (longitudinal direction). This tendency is due to the increasing use of "universal" threads generated by the envelope of two standard conical profiles (for example, the envelope of a BSPT profile and an NPTF profile, which are much used in hydraulics and pneumatics).

The "universal" threads are well known to be shorter than normal standard threads. This is to allow generation of the envelope on which they are based.

The "universal" thread does not produce a fluid-tight connection between the flanks of the thread of the shank and those of the thread of the seat. The sealing system therefore assumes a fundamental importance in the functionality of the connection.

Generally speaking, sealing systems use a sealing ring to act as a physical obstacle to the escape of fluid into the external environment.

A practical example of a sealing system with a sealing ring for making couplings with a threaded shank used in hydraulic or pneumatic applications is disclosed in U.S. Pat. No. 5,441,314.

The above patent discloses a sealing system that uses a groove in the vicinity of the threaded shank, at the opposite end to the end of the shank. The groove contains a PTFE (polytetrafluoroethylene) sealing ring that has conical side walls and is shaped so as to fit the walls of the groove.

It is known, however, that the manufacture and inspection of sealing rings that have conical side walls can present some difficulties, which increases the costs of manufacture.

High productivity for PTFE sealing rings is ensured by lathe turning, which can only be done with great difficulty to produce conical sealing rings.

Moreover, to inspect a conical sealing ring, as must be done to ensure stable fitting of the ring in its groove, requires measuring two diameters and one thickness, or one diameter, one length and one cone angle. This greatly increases inspection times.

There is therefore an awareness of the need to provide high productivity sealing systems with sealing rings which, at the same time, will ensure that the ring is a good fit in its groove.

The problem addressed by the present invention is that of devising a sealing system with a sealing ring in which the structural and functional characteristics are such as to fulfil the abovementioned needs and at the same time obviate the disadvantages indicated with reference to the prior art.

SUMMARY OF THE INVENTION

The problem is solved by a sealing system with sealing ring for coupling members for connecting pipes to user devices such as pumps, compressors, tanks and the like, by means of a shank that screws into a seat provided on the user device and comprises a groove and an annular seal.

The groove is situated in a position adjacent to the shank of the coupling member at the opposite end from the end of the shank, and is able to receive the sealing ring which is designed to be pressed against an abutting wall or flared portion of the seat of the user device in order to establish the seal.

The annular seal, in its original configuration prior to assembly, is of an essentially cylindrical shape and, in the configuration of compression of the sealing ring on the groove, assumes a shape adapted to the profile of the groove.

BRIEF DESCRIPTION OF THE DRAWINGS

Further features and the advantages of the sealing system according to the present invention will become clear in the course of the following description of a preferred embodiment thereof given by way of non-restrictive indication with reference to the accompanying figures, in which.

DETAILED DESCRIPTION OF THE PREFERRED EMBODIMENT

Figure 1:
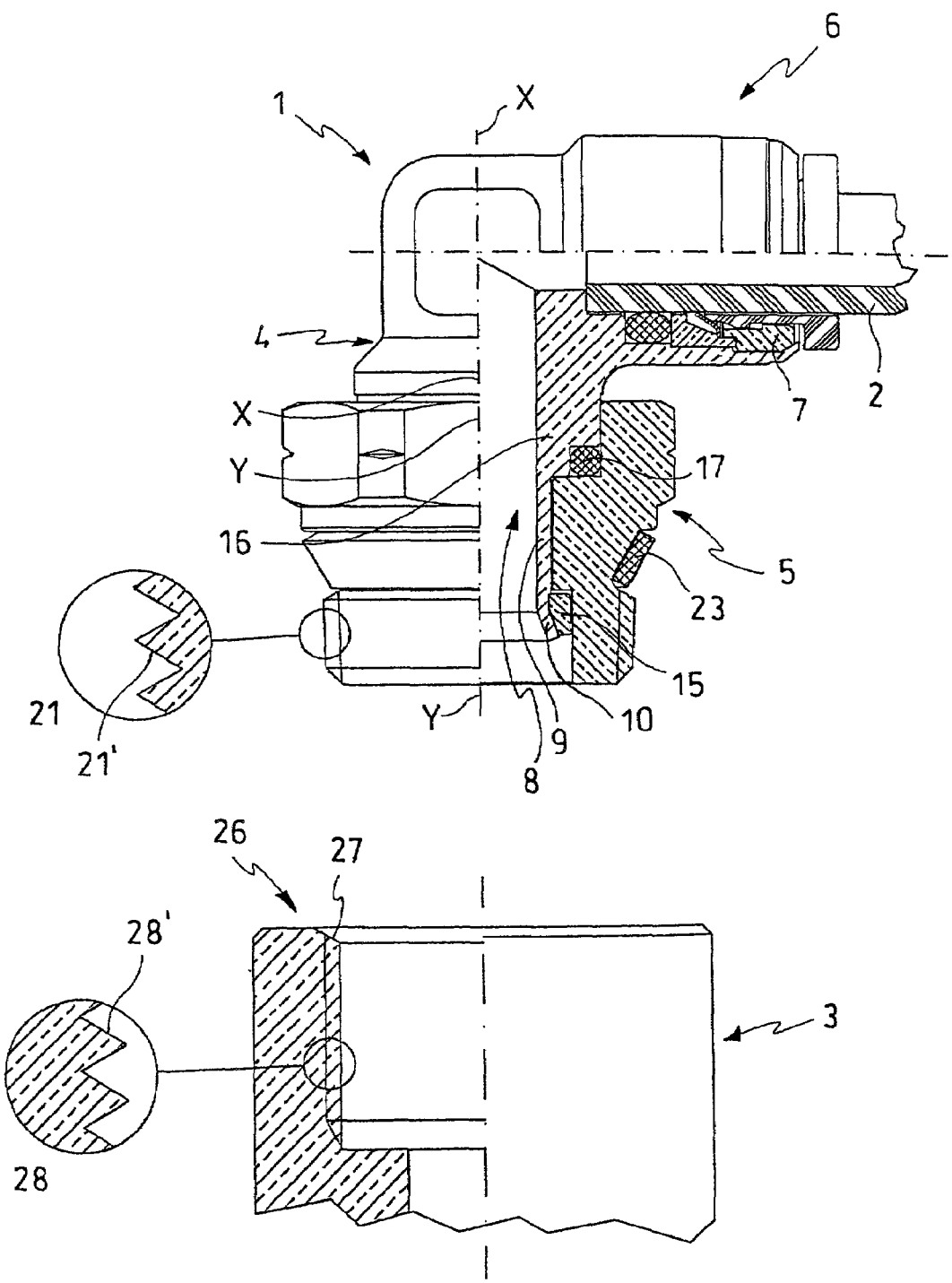
FIG. 1 shows a partial longitudinal section through a sealing system with a sealing ring mounted on a coupling member with a 90° insert and threaded swivel nut for connecting together a pipe and a user device (not shown), the latter having a seat. This is shown in a configuration of disengagement between the coupling member and the seat.

With reference to FIG. 1, the number 1 denotes a coupling member for joining a pipe 2, which is generally of plastic, to a user device (not shown) that has a threaded seat 3. The said seat is provided with a thread 28 of the seat 3 and said thread is limited by flanks 28' of the thread 28 of the seat 3.

The inside of the coupling member 1 is intended to contain a stationary or moving fluid, which may be liquid (oil or water) or gaseous (air), which flows from the pipe 2 to the user device or vice versa.

The coupling member 1 comprises a hollow insert 4 and a swivel nut 5 in which the said insert 4 is mounted, in the configuration of engagement between the insert 4 and the swivel nut 5.

The insert 4 is connected, towards one end 6, to the pipe 2. The connection is made possible by a series of clamping and sealing elements 7 situated in the gap between the pipe 2 and the first end 6 of the insert 4.

The clamping and sealing elements 7 make it possible to clamp the pipe 2 in the first end 6 of the insert 4, and at the same time prevent fluid leaking out.

The insert 4 is provided, towards a second end 8, with an external annular projection 16 and a smooth extension 9 of essentially cylindrical shape, wrapped around an axis X-X of the extension.

The extension 9 is provided with an end portion 10 which, in the configuration of engagement between the insert 4 and the swivel nut 5, is flared to give an essentially frustoconical configuration. The end portion 10 of the extension 9 is flared in order to retain the insert 4 and the swivel nut 5 axially. In other words, the flared end portion 10 prevents the insert 4 and the swivel nut 5 from coming apart along the direction of the axis X-X of the extension.

Figure 3:
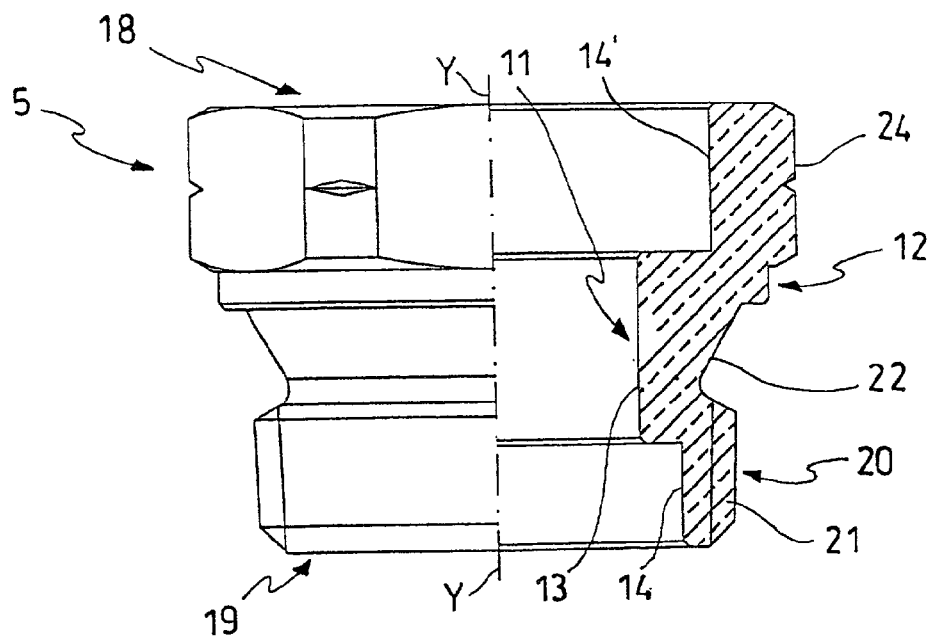
FIG. 3 shows a partial longitudinal section through the sealing system groove formed on the swivel nut, the latter having a threaded shank.

The swivel nut 5, which is internally hollow (FIG. 1 and FIG. 3), is essentially cylindrical and is wrapped around an axis Y-Y of the nut which, preferably, in the configuration of engagement between the swivel nut 5 and the insert 4, coincides with the axis X-X of the extension of the insert 4.

The swivel nut 5 is defined by an inner surface 11 and an outer surface 12 which are suitably shaped. The first end 18 of the nut engages with the second end 8 of the insert 4 and the second end 19 of the nut points towards the seat 3 of the user device.

The inner surface 11 of the swivel nut 5 is formed by a succession of annular reliefs 13 and annular grooves 14 and 14'.

In the configuration of engagement between the insert 4 and the swivel nut 5, the smooth extension 9 of the insert 4 is guided in position by the annular projection 13 of the swivel nut 5 and the flared end portion 10 of the smooth extension 9 retains an anchoring ring 15 which anchors it against one of the annular grooves 14 of the swivel nut 5. An internal sealing ring 17 is held in position against the annular groove 14' of the swivel nut 5 by the annular projection 16 of the insert 4.

The anchoring ring 15 prevents the swivel nut 5 from separating from the coupling member 1 because of the flaring of the end portion 10 of the smooth extension 9.

The inner sealing ring 17 prevents the fluid from leaking out through the gap between the inner surface 13 of the swivel nut 5 and the insert 4.

The outer surface 12 of the swivel nut 5 has a profile on which a succession of portions can be identified.

Towards the second end 19 of the nut, the outer surface 12 of the swivel nut 5 comprises a shank 20 that can be screwed into the seat 3 of the user device by means of its thread 21, limited by flanks 21' of the shank thread.

The thread on the shank 21 is preferably conical and, in a preferred embodiment, is generated by the envelope of two similar conical profiles, generally a BSPT type profile and an NPTF type profile.

Next to the shank 20, at the opposite end from the end of the shank, the outer surface 12 of the swivel nut 5 comprises an annular groove 22.

In a preferred embodiment of the sealing system, the groove 22 is of frustoconical configuration. The groove is preferably shaped frustoconically according to the teaching of international standard ISO-UNI 5711-65.

Figure 4:
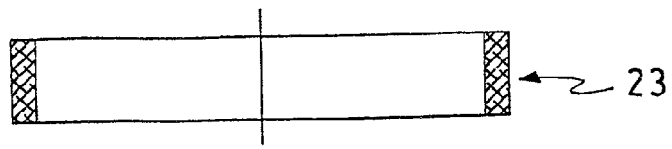
FIG. 4 shows in plan view and longitudinal section the sealing ring of the sealing system, in the original configuration prior to assembly of the ring on the groove.
Figure 4:
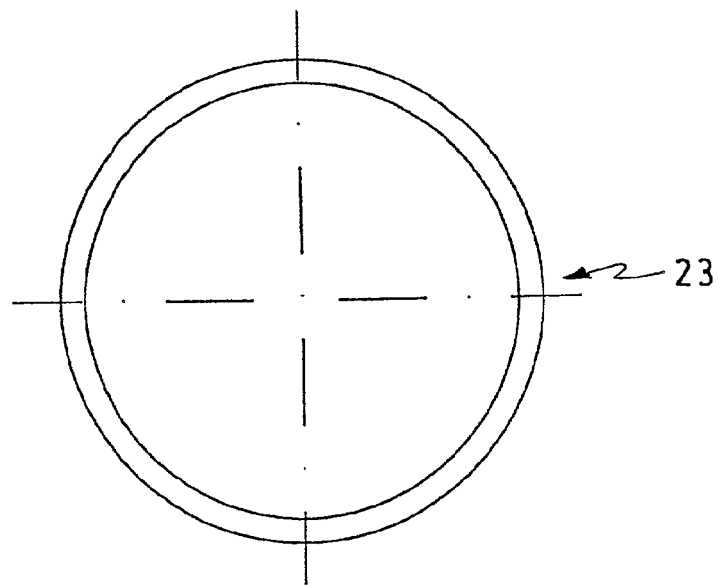

The groove 22 of the swivel nut 5 is designed to receive an annular seal 23 (FIG. 1 and FIG. 4). The latter is designed to be pressed against a wall of the seat 3 of the user device to create the seal.

In a preferred embodiment of the sealing system, the sealing ring 23 is made of plastic or elastoplastic, generally PTFE.

The sealing ring 23 is of essentially cylindrical shape in an original configuration prior to assembly on the groove 22 (FIG. 4) and, when fitted on the groove 22, assumes a shape adapted to the groove profile (FIG. 1).

Towards the first end 18 of the nut 5 (FIG. 3), the outer surface 12 of the swivel nut 5 has a gripping portion 24, suitable for being gripped by a tool so that the swivel nut 5 can be screwed onto the seat 3.

In the original configuration prior to assembly of the sealing ring 23 on the groove 22, the sealing ring 23 is of essentially cylindrical shape. A tool is used to grip the sealing ring and stretch and expand it. The material of which the sealing ring 23 is made expands elastically under the action of the tool.

The expanded sealing ring 23 can be fitted onto the groove 22 of the swivel nut 5. When released by the tool, the sealing ring 23 exhibits elastic return, and grips the groove 22 tightly. When the sealing ring 23 is fitted on the groove 22, the sealing ring 23 assumes a shape adapted to the profile of the groove 22.

As a matter of preference, by giving the groove 22 a frustoconical profile, the sealing ring 23 in the fitted configuration assumes a frustoconical profile.

Figure 2:
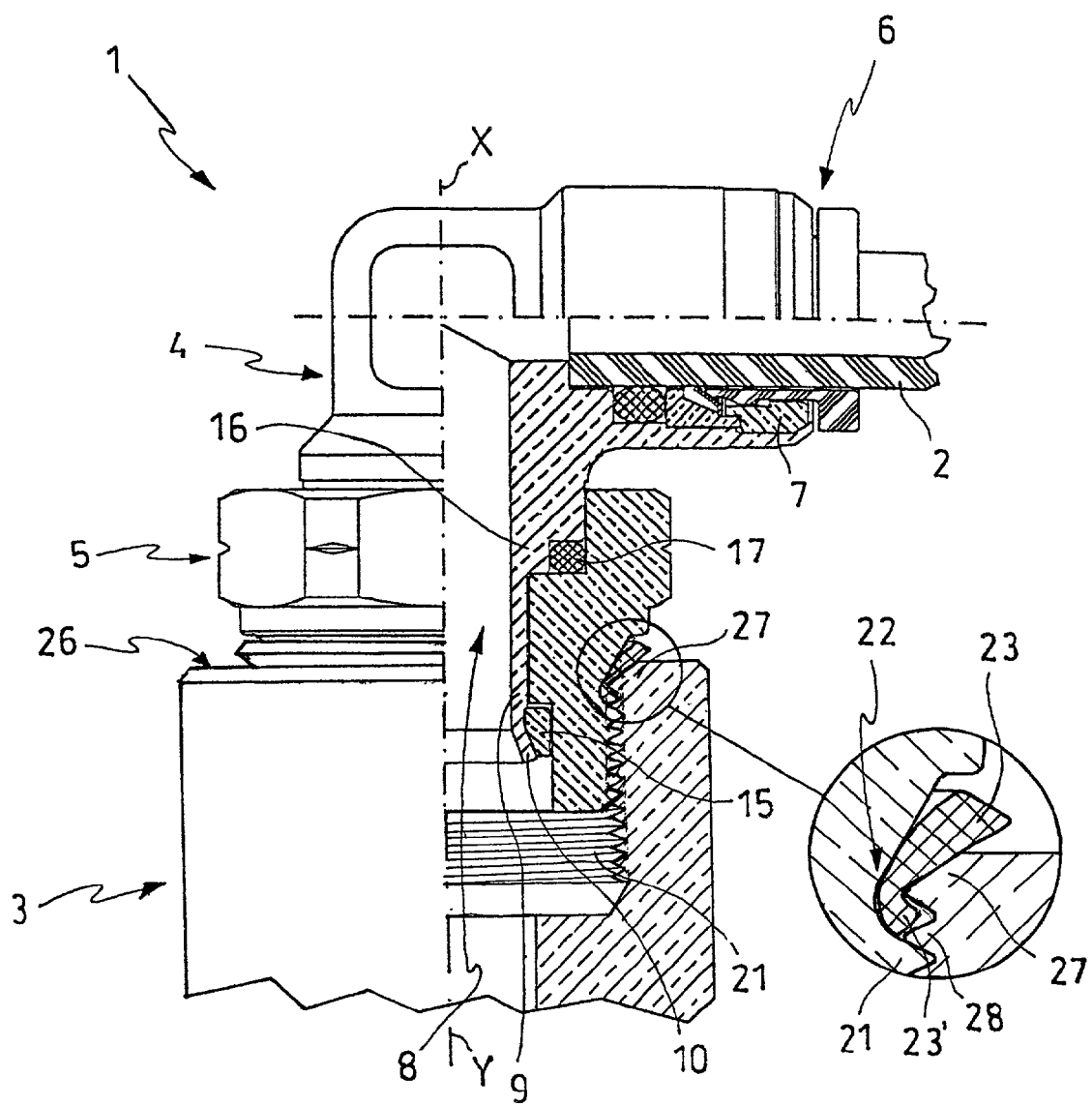
FIG. 2 shows the sealing system with a sealing ring as in FIG. 1, in a configuration of assembly of the coupling member in the seat.

By gripping the swivel nut 5, it is possible to screw the shank 20 of the swivel nut 5 onto the seat 3 of the user device, taking the coupling member 1 from a configuration of disengagement from the seat 3 to a screwed-on configuration of engagement (FIG. 2).

As the swivel nut 5 is screwed into the seat 3, the sealing ring 23 comes into contact with an abutting wall 26 of the seat 3, preferably having a flare 27. The interference between the abutting wall 26, or the flare 27, of the seat 3, and the sealing ring 23 causes the sealing ring to deform.

The deformation of the sealing ring 23 is initially elastic. In other words, when the connection between the swivel nut 5 and the seat 3 is relaxed by unscrewing the swivel nut 5, the sealing ring 23 returns to the condition assumed in the configuration of disengagement of the coupling member 1 from the seat 3.

As the swivel nut 5 continues to be screwed into the seat 3, the coupling member 1 reaches the screwed-on configuration of engagement with the seat 3, in which the sealing ring 23 is deformed plastically by interference with the abutting wall 26 or with the flare 27 of the seat 3. In the screwed-on configuration of engagement of the coupling member with the seat 3, one portion 23' of the sealing ring 23 comes between the flanks 28' of the thread 28 of the seat 3.

In other words, the plastic deformation of the sealing ring 23 in the screwed-on configuration of engagement between the coupling member 1 and the seat 3 causes the material of the sealing ring 23 to flow between the flanks 28' of the thread 28 of the seat 3.

The main advantage of the sealing system according to the present invention lies in the unusually high rate of production of its sealing ring and in the excellent fit of the said sealing ring on the groove.

A high rate of production of PTFE sealing rings is achieved by turning them on a lathe from cylindrical bars. Lathe-turning of conical sealing rings can only be done with great difficulty.

The sealing system also has the advantage of preventing leakage of fluid out through the threaded connection between the coupling member and the threaded seat of the user device.

Figure 5:
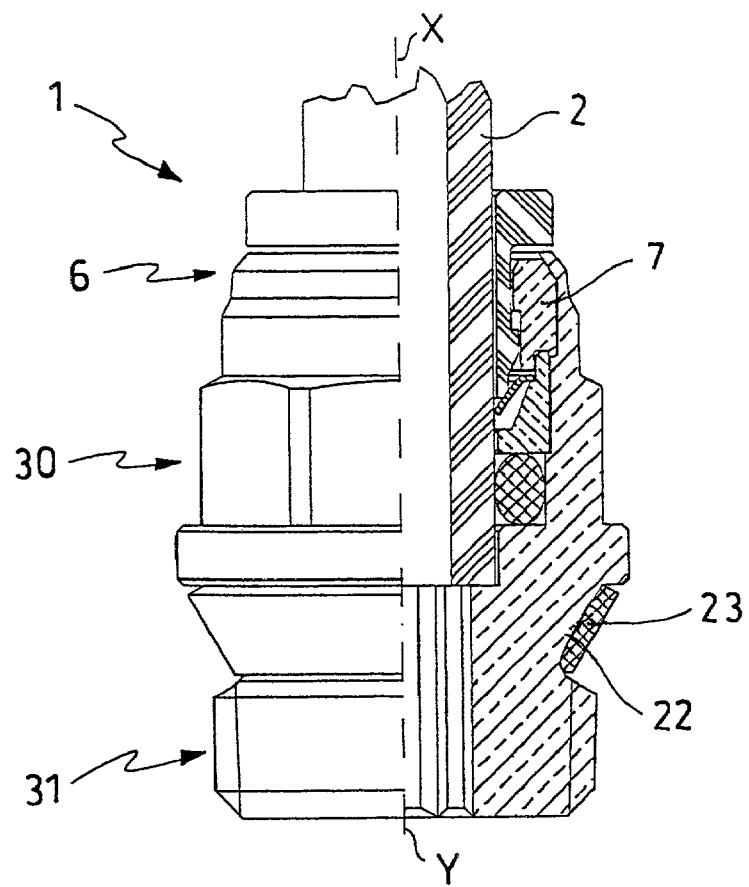
FIG. 5 is a partial longitudinal section through the sealing system with a sealing ring on a coupling member with insert only provided with a threaded shank for connecting together a pipe and a user device (not shown), the latter having a threaded seat. This is shown in the configuration of disengagement of the coupling member from the seat.
Figure 5:
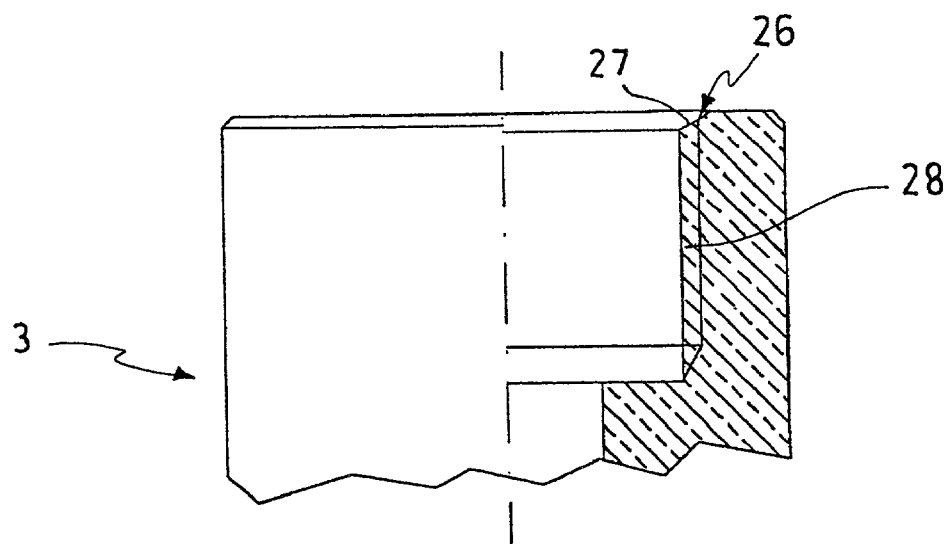
Figure 6:
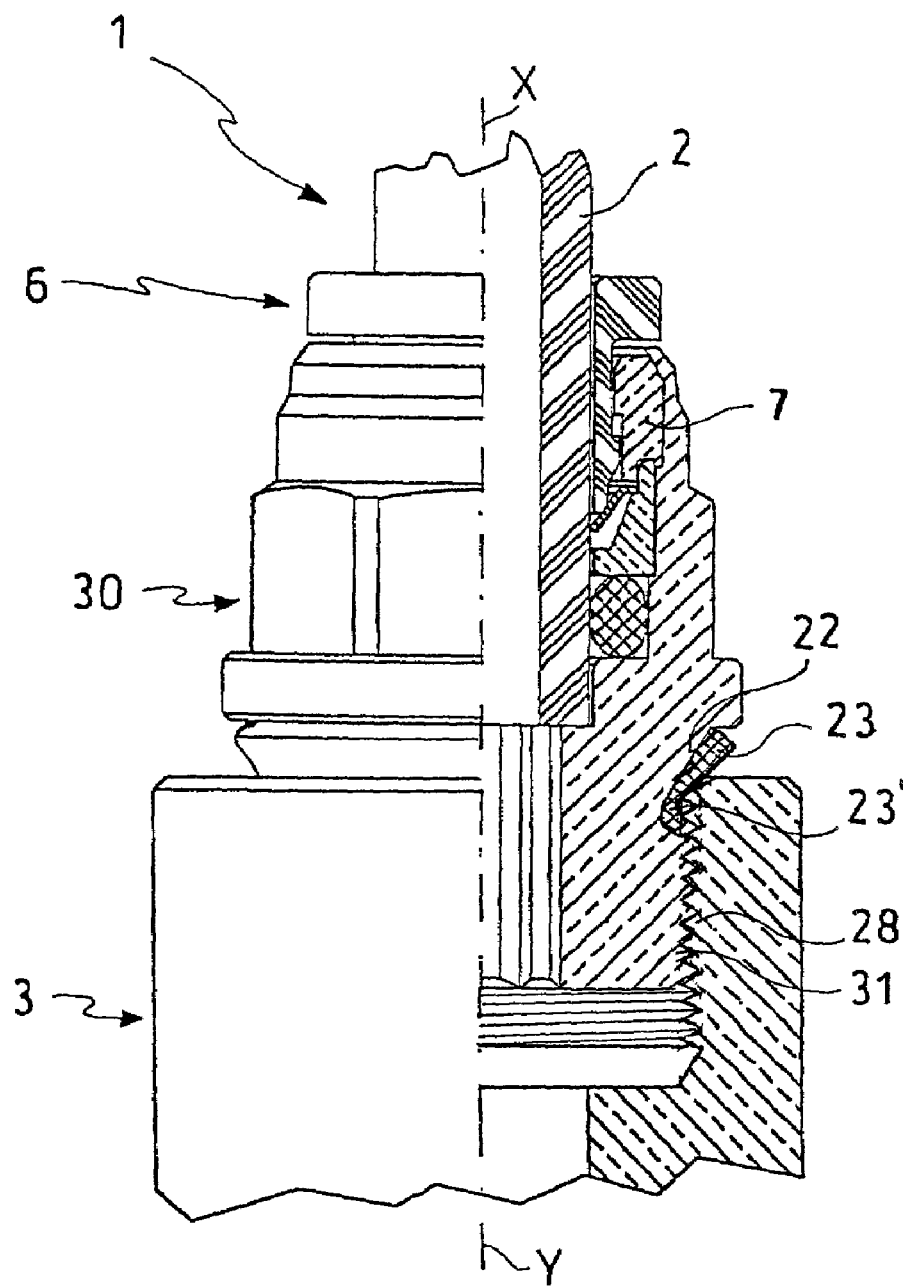
FIG. 6 shows the sealing system with a sealing ring as in FIG. 5, in a configuration of assembly of the coupling member in the seat.

A variant of the same invention is shown in FIG. 5 and in FIG. 6, where parts structurally and functionally identical to those of the sealing system shown in FIGS. 1, 2, 3 and 4 keep the same reference numbers and are not described below.

The coupling member 1 comprises an insert 30 (FIG. 5) connected towards the first end 6 to the pipe 2 by means of the series of clamping and sealing elements 7. The second end 8 of the insert 30 has a threaded shank 31 which screws into the seat 3 of the user device.

Next to the threaded shank 31, at the opposite end from the shank end, the insert 30 has the groove 22 in which the annular seal 23 is positionable, in the fitted configuration.

In the screwed-on configuration of engagement between the coupling member 1 and the seat 3 (FIG. 6), the insert 30 is screwed into the threaded seat of the user device.

Clearly, in order to meet contingent and specific requirements, a person skilled in the art could make numerous modifications and alterations that would all be contained in the scope of protection of the invention as defined by the following claims, to the sealing system with sealing ring as described above and explained with reference to the figures.

What is claimed is:

1. A sealing system for connecting a pipe to a user device, said sealing system comprising:
   a coupling member having a shank extending therefrom;
   a shank thread formed on the shank and extending to one end of the shank, said shank thread having a profile which is generated by the envelope of two similar profiles;
   said shank also being formed with a frusto-conical groove adjacent the shank thread;
   an elastic sealing ring fitted into said groove and elastically conforming to the conical configuration of the groove, said sealing ring being cylindrical in its unstressed condition;
   whereby, when the shank is screwed onto a threaded seat formed with either of said two similar profiles, the seat will engage the sealing ring and plastically deform it to cause a portion of the sealing ring to come between the flanks of the thread of the seat.

2. The sealing system according to claim 1, in which the shank is provided with a universal thread.

3. The sealing system according to claim 1, in which the sealing ring is made of an elastoplastic material.

4. The sealing system according to claim 3, in which the sealing ring is made of polytetrafluoroethylene (PTFE).

5. The sealing system according to claim 1, in which an abutting wall of said seat is flared to promote contact between the sealing ring and the seat of the user device.

6. The sealing system according to claim 1, in which, in a configuration of engagement of the sealing ring with the seat, a portion of the sealing ring is disposed on the groove radially inwardly with respect a flare of the seat.

7. The sealing system according to claim 6, in which an external surface of the groove and a surface of the flare of the seat are non-parallel surfaces.

8. A sealing system for connecting a pipe to a user device, said sealing system comprising:
   a coupling member having a shank extending therefrom;
   a shank thread formed on the shank and extending to one end of the shank and adapted to be screwed onto a seat on the user device,
   said shank also being formed with a frusto-conical groove adjacent the shank thread;
   an annular elastoplastic sealing ring fitted into said groove adapted to be pressed against an abutting wall of the seat to establish a seal and elastically conforming to the conical configuration of the groove, said sealing ring being cylindrical in its unstressed condition;
   whereby, when the shank is screwed onto the seat, the seat will engage the sealing ring and plastically deform it to cause a portion of the sealing ring to come between the flanks of the thread of the seat.

9. A sealing system for connecting a pipe to a user device, said sealing system comprising:
   a coupling member comprising a hollow insert clamped to a pipe, and a swivel nut in which the hollow insert is mounted,
   the swivel nut having a shank extending therefrom mating with a seat in the user device;
   a shank thread formed on the shank and extending to one end of the shank, said shank thread having a profile which is generated by the envelope of two similar conical profiles;
   said swivel nut also being formed with a frusto-conical groove adjacent the shank thread, and having an elastic sealing ring fitted into said groove and elastically conforming to the frusto-conical configuration of the groove, said sealing ring being cylindrical in its unstressed condition so that when the shank is screwed onto a threaded seat formed with either of said two similar profiles, a flared wall of the seat presses against the sealing ring and a portion of the sealing ring comes between the flanks of the thread of the seat.

10. A sealing system for connecting a pipe to a user device, the sealing system comprising:
    a coupling member having a shank extending therefrom;
    a shank thread formed on the shank and extending to one end of the shank, the shank thread having a profile which is generated by the envelope of two similar profiles;
    the shank also being formed with a groove having a frusto-conical surface and being adjacent the shank thread;
    an elastic sealing ring fitted entirely on the frusto-conical surface of the groove and elastically conforming to the conical configuration of the groove, said sealing ring being cylindrical in its unstressed condition and having a rectangular cross-sectional shape;
    a threaded seat of the user device, the coupling member being screwed in the seat, the threaded seat being formed with either of said two similar profiles; whereby, the seat engages the sealing ring and plastically deforms it, a portion of the sealing ring being deformed between the flanks of the thread of the seat, and whereby the conical surface of the groove extends radially over the internal diameter of the thread of the seat.

* * * * *